United States Patent
Harris

(10) Patent No.: US 7,836,320 B2
(45) Date of Patent: Nov. 16, 2010

(54) POWER MANAGEMENT IN A DATA PROCESSING APPARATUS HAVING A PLURALITY OF DOMAINS IN WHICH DEVICES OF THE DATA PROCESSING APPARATUS CAN OPERATE

(75) Inventor: Peter William Harris, Cambridge (GB)

(73) Assignee: ARM Limited, Cambridge (GB)

( * ) Notice: Subject to any disclaimer, the term of this patent is extended or adjusted under 35 U.S.C. 154(b) by 1067 days.

(21) Appl. No.: 11/482,106

(22) Filed: Jul. 7, 2006

(65) Prior Publication Data

US 2008/0010473 A1     Jan. 10, 2008

(51) Int. Cl.
    *G06F 1/32*     (2006.01)
(52) U.S. Cl. .................. 713/324; 711/129; 711/163; 713/320; 726/27
(58) Field of Classification Search ............... 713/300, 713/320, 324; 711/129, 163; 726/27
    See application file for complete search history.

(56) References Cited

U.S. PATENT DOCUMENTS

| | | | | |
|---|---|---|---|---|
| 5,987,614 | A * | 11/1999 | Mitchell et al. | 713/300 |
| 6,968,467 | B2 * | 11/2005 | Inoue et al. | 713/320 |
| 2004/0143714 | A1 | 7/2004 | Watt | |
| 2004/0177261 | A1 | 9/2004 | Watt et al. | |
| 2006/0282621 | A1 * | 12/2006 | Moyer | 711/141 |
| 2007/0204137 | A1 * | 8/2007 | Tran | 712/214 |

OTHER PUBLICATIONS

D. Page, "Partitioned Cache Architecture as a Side-Channel Defence Mechanism," Cryptology ePrint Archive: Report 2005/280, Aug. 2005.*
F. Rawson, "Supporting Isolation for Fault and Power Management with Fully Virtualized Memory Systems" Jan. 2004, pp. 1-15.
N. Kim et al, "Drowsy Instruction Caches", Intl. Symp. on Microarchitecture, 2002.
K. Flautner et al "Drowsy Caches: Simple Techniques for Reducing Leakage Power", ISCA, 2002.

* cited by examiner

*Primary Examiner*—Albert Wang
(74) *Attorney, Agent, or Firm*—Nixon & Vanderhye P.C.

(57) ABSTRACT

A data processing apparatus and method are provided for performing power management. The data processing apparatus has a plurality of domains in which devices of the data processing apparatus can operate, and comprises at least one master device for performing operations and at least one slave device for use by such master devices when performing those operations. Each master device is arranged to issue a domain ID signal identifying the domain in which that master device is currently operating. Further, power control logic is provided for determining, based on the domain ID signal issued by the various master devices, whether any portion of a slave device is not currently useable, and if so to cause any such portion to enter a power saving state. This provides a particularly efficient technique for power management in such a data processing apparatus.

18 Claims, 8 Drawing Sheets

US 7,836,320 B2

POWER MANAGEMENT IN A DATA PROCESSING APPARATUS HAVING A PLURALITY OF DOMAINS IN WHICH DEVICES OF THE DATA PROCESSING APPARATUS CAN OPERATE

BACKGROUND OF THE INVENTION

1. Field of the Invention

The present invention relates to a data processing apparatus having a plurality of domains in which devices of the data processing apparatus can operate, and more particularly to power management techniques within such a data processing apparatus.

2. Description of the Prior Art

A data processing apparatus will typically include one or more master devices, for example a central processing unit (CPU), a Direct. Memory Access (DMA) engine, a hardware accelerator, etc for performing sequences of operations. When performing such operations, the master devices will typically have access to one or more slave devices, for example memory devices, peripheral devices, etc. Program code defining the sequence of operations, and/or data required when performing such operations, will be stored within memory, either internal to the data processing apparatus, or externally to the data processing apparatus. The term "data values" will be used herein to collectively identify program code and/or data required when executing such code.

There arise many instances where the data values associated with one application are sensitive data values that should not be accessible by other applications running on devices of the data processing apparatus. It is clearly important in such situations to ensure that such sensitive data is kept secure so that it cannot be accessed by other applications that may be loaded on to the data processing apparatus, for example hacking applications that have been loaded on to the data processing apparatus with the purpose of seeking to access that sensitive data.

It has traditionally been the job of the operating system developer to ensure that the operating system provides sufficient security to ensure that the secure data of one application cannot be accessed by other applications running under the control of the operating system. However, as systems become more complex, the general trend is for operating systems to become larger and more complex, and in such situations it becomes increasingly difficult to ensure sufficient security within the operating system itself. To seek to alleviate the reliance on operating system security it is known to provide a system in which the data processing apparatus is provided with separate domains, these domains providing a mechanism for handling security at the hardware level. Such a system is described for example in commonly assigned co-pending U.S. patent application Ser. No. 10/714,561, the contents of which are herein incorporated by reference, this application describing a system having a secure domain and a non-secure domain. In that system, the non-secure and secure domains in effect establish separate worlds, the secure domain providing a trusted execution space separated by hardware enforced boundaries from other execution spaces, and likewise the non-secure domain providing a non-trusted execution space.

Whilst such systems have been designed with security in mind, it should be noted that security issues are not the only reason for using a data processing apparatus having such domains, and indeed the different domains provided by the data processing apparatus may be used primarily for other purposes. For example, robustness and reliability may be improved through use of such domains. Even if the data in a first domain is not sensitive in the security sense, it may be data which desirably should be protected from being overwritten by bugs in the rest of the platform, for example because such overwriting may cause some critical operation not to happen. By having the hardware split resulting from the use of multiple domains, the software in that first domain should remain intact even if the software executing in another domain operates incorrectly due to a bug.

Within such a data processing apparatus, it is typically the case that not all of the hardware resources can be used at any particular point in time. As an example, considering the earlier-described system that provides a secure domain and a non-secure domain, the system will typically be arranged such that in the non-secure domain, a device within the data processing apparatus will not have access to secure data associated with the secure domain. Similarly, certain peripheral devices may only be used by a master device operating in the secure domain.

In some situations, power consumption of the data processing apparatus can be a significant concern, and in such situations it is desirable to provide a data processing apparatus having low power consumption requirements.

In the different technical field of software virtualisation, the IBM article entitled "Supporting Isolation for Fault and Power Management with Fully Virtualized Memory Systems" by F Rawson, Jan. 3, 2004, appearing at web address www.research.ibm.com/arl/publications/papers/reverse_mapping.pdf, describes a power management technique that can be used in fully virtualized memory systems. In such fully virtualized systems, a hypervisor layer is provided that operates directly on the hardware and supports the execution of multiple operating systems in isolation on a single machine. The hypervisor layer enables multiple operating systems to run at once, and seeks to hide one operating system from the other. In the above document, the hypervisor layer uses a standard reverse mapping technique to support power management, especially cooperative power management of memory. Reverse mapping is a technique often used in operating systems to enable them to track efficiently which address spaces use which physical pages of memory. With the information provided by the reverse mapping, the hypervisor layer can implement memory power management techniques that take the behaviour and activity levels of the system images running within the virtual machines into account.

The approach described in the IBM article is complex, since it requires the reverse mapping technique to be implemented to produce certain information, and then requires software to be written to perform the necessary power management routines dependent on that information. Such a technique is hence costly in terms of the software that needs to be provided, and can adversely impact performance due to the time taken to run such power management software. Additionally, such a technique does not assist in achieving power saving benefits in a data processing apparatus of the earlier described type having a plurality of domains where certain portions of the slave devices will not be used by master devices operating in particular domains.

Accordingly, it would be desirable to provide a technique for reducing power consumption in a data processing appa-

SUMMARY OF THE INVENTION

Viewed from a first aspect, the present invention provides a data processing apparatus having a plurality of domains in which devices of the data processing apparatus can operate, comprising: at least one master device for performing operations, each said at least one master device being arranged to issue a domain ID signal identifying the domain in which that master device is currently operating; at least one slave device for use by said at least one master device when performing said operations; and power control logic for determining, based on the domain ID signal issued by each said at least one master device, whether any portion of said at least one slave device is not currently useable and if so to cause any such portion to enter a power saving state.

In accordance with the present invention, each master device is arranged to issue a domain ID signal identifying the domain in which that master device is currently operating. Power control logic is then provided which determines, based on the domain ID signal issued by each relevant master device, whether any portion of a slave device is not currently useable. For a slave device that is only used by a single master device, then only the domain ID signal issued by that master device will be relevant, but for a slave device used by a plurality of master devices, then the domain ID signals issued by all of those master devices will be relevant. If it is decided that, having regard to the domain ID signals, a particular portion of a slave device is not currently usable, then the power control logic causes that portion to enter a power saving state.

The actual form of the power saving state may depend on the type of slave device. For example, for a slave device in the form of a memory device, the power saving state may take the form of a reduced power consumption state which still retains the data held in the memory device. For a slave device in the form of a peripheral device, the power saving state may be a reduced power consumption state which can quickly return to the full power state, or in some embodiments may be a full power off state.

Each master device may be arranged to issue the domain ID signal in a variety of ways. In one embodiment, each master device is arranged to broadcast the domain ID signal. In one particular embodiment, that domain ID signal is broadcast each time the master device changes from operating in one domain to operating in another domain. However, it will be appreciated that in an alternative embodiment the domain ID signal could be continuously broadcast.

By arranging each master device to issue a domain ID signal identifying the domain in which it is currently operating, and then providing power control logic to determine based on the received domain ID signals whether any portions of the one or more slave devices within the data processing apparatus are not currently useable, this provides a particularly efficient mechanism for triggering power saving states for those slave devices during periods when they are not being used.

The power control logic can be arranged to operate in a variety of ways. However, in one embodiment, each portion of said at least one slave device has a control field associated therewith indicating which of said plurality of domains are allowed to use that portion; and the power control logic is operable for each portion, to reference said associated control field and the domain ID signal issued by each said at least one master device, in order to determine whether that portion is not currently useable, and if so to cause that portion to enter said power saving state. In one embodiment, the power control logic is provided centrally for managing the power state of multiple slave devices. In another embodiment, power control logic can be provided specifically in association with a slave device solely to manage the power states of that slave device.

The plurality of domains can take a variety of forms. In one embodiment, any one master device can only operate in one domain at a time, but at any point in time different master devices within the system can be operating in different domains. Each domain serves to separate one execution space from another execution space using hardware enforced boundaries. There can be a number of reasons for wanting to separate one execution space from another execution space. In one embodiment, the main reason for providing separate execution spaces is security, and in particular the desire to keep certain data of an execution space secure from other execution spaces. In particular, in one embodiment, the plurality of domains comprise a secure domain and a non-secure domain, in said secure domain devices of the data processing apparatus having access to secure data values which are not accessible in said non-secure domain.

The at least one slave device provided within the data processing apparatus can take a variety of forms. In one embodiment, at least one slave device comprises a memory device for storing data values for access by one or more master devices when performing operations. In one embodiment, one or more of the slave devices may be peripheral devices, for example hardware cryptographic accelerators, timers, real time clocks, counters, keyboard/mouse interfaces, etc. Whilst any of the above peripheral devices could be arranged to be subjected to the above power saving state, it will be appreciated that in some embodiments it may not be appropriate for one or more of those peripheral devices to be subjected to the power saving state.

The power control logic can be arranged in a variety of ways to manage the power state of such a memory device. However, in one embodiment, each portion of said at least one memory device has a control field associated therewith identifying with which domain the data values stored in that portion are associated, each domain has predetermined access rights associated therewith identifying any other of said plurality of domains whose data values can be accessed from that domain, and the power control logic is operable for each portion, to reference said associated control field, said predetermined access rights, and the domain ID signal issued by each said at least one master device, in order to determine whether that portion is not currently accessible, and if so to cause that portion to enter said power saving state. Depending on the type of memory device, and the way in which it is used by the data processing apparatus, that memory device may have only a single portion, or may have multiple portions. Through use of the predetermined access rights, the manner in which data can be shared between domains, if at all, is identified. For example, considering the earlier-mentioned example of a secure domain and a non-secure domain, the predetermined access rights for the non-secure domain will identify that it can only access non-secure data associated with that non-secure domain, whilst the predetermined access rights for the secure domain will identify that, in addition to the secure data associated with that secure domain, non-secure data associated with the non-secure domain can also be accessed from the secure domain.

In one embodiment, the at least one memory device comprises a cache, and said power control logic is operable to determine, based on the domain ID signal issued by each said at least one master device having access to said cache, whether any portion of said cache is not currently accessible and if so to cause any such portion to enter said power saving state. The power control logic can be arranged in a variety of ways, and in one example the cache may have a dedicated power control logic associated therewith. In an alternative embodiment, a centralised power control logic can be provided to manage the power state of a cache and possibly one or more additional memory devices. In such an embodiment, considering the earlier example of a secure domain and a non-secure domain, the cache may be arranged to only store secure data in one or more predetermined ways of the cache. Hence, if the power control logic identifies that the secure data cannot currently be accessed given the state of the one or more master devices having access to that cache, it can power down the relevant one or more ways containing the secure data.

In one embodiment where a cache is provided, each portion comprises one or more cache lines, for each portion the cache having a control field identifying with which domain the data values stored in that portion are associated, and said power control logic is operable to determine for each portion, having regard to the associated control field, whether that portion is currently accessible by any of said at least one master device having access to said cache, and if not to cause that portion to enter said power saving state. In one particular embodiment, each domain has predetermined access rights associated therewith identifying any other of said plurality of domains whose data values can be accessed from that domain, and the power control logic is operable for each portion, to reference said associated control field, said predetermined access rights, and the domain ID signal issued by each said at least one master device having access to said cache, when determining whether that portion is currently accessible.

The number of cache lines included in each portion can vary dependent on embodiment. However, in one embodiment, each portion comprises a single cache line. In one embodiment, one of the master devices is a processor core and the cache is associated with, and only accessible by, that processor core. An example of a cache that may be arranged in such a way is a level one cache. In addition, or alternatively, in an apparatus having multiple master devices, the cache may be arranged to be accessible by multiple such master devices, hence taking the form of a system level cache.

As mentioned earlier, the power control logic can be provided in a variety of ways. In one embodiment, the power control logic is provided within cache control logic associated with the cache.

In one embodiment, a memory device can be arranged to be a domain specific memory device having a single portion used solely to store data values associated with a particular one of the domains. In such embodiments, if the power control logic determines that that single portion is not currently useable, i.e. its contents cannot be accessed by any of the master devices given the master devices' current domains then the entire domain specific memory device is caused to enter the power saving state. This power saving state will typically be a low power consumption, but data retaining, state, such that when the power saving state is exited, the data is still retained and accessible within the memory device.

One potential disadvantage of placing a slave device into a power saving state is that when subsequently an access to that slave device is required, the slave device has to first exit the power saving state before it can be used, this potentially having an adverse impact on performance. In one embodiment, this problem is alleviated through the provision of look-ahead logic associated with at least one of the master devices, which is operable to detect a situation which will subsequently cause the associated master device to change from a current domain to a new domain, and upon detecting said situation to cause any portion of said at least one slave device in said power saving state to exit said power saving state. Hence, in such embodiments, the power saving state is exited prior to a domain switch actually taking place, so that by the time the domain switch has taken place, any slave device then useable will be powered up and ready to be used. Once the domain switch has taken place, the power control logic can then again be used to determine whether any portion (s) of the slave device(s) can then enter the power saving state.

In one particular embodiment, the associated master device is a processor core operable to execute a sequence of instructions, and the look-ahead logic is operable to detect said situation by detecting one or more instructions that when subsequently executed by the processor core will case the domain to change. In one such embodiment, the look-ahead logic is provided within prefetch logic used to prefetch instructions for execution by processing pipelines within the processor core. Hence, in such an embodiment, the look-ahead logic can be used to detect upcoming instructions, or instruction sequences, that would have the effect of causing the processor core to switch from the currently executing domain to another domain, and on detecting such a situation, the prefetch logic can cause any slave device currently in a power saving state to exit that power saving state in readiness for the domain switch. After the domain switch, the power control logic can then determine which slave devices, or portions thereof, are now not useable, and cause those portions to enter a power saving state.

In such embodiments, it is possible that the look-ahead logic will in some cases incorrectly detect the upcoming domain switch, because the relevant instructions are in fact not subsequently executed by the processor core, for example because of a branch earlier in the instruction stream. This can be dealt with as part of the process for handling mispredictions and all that will have happened is that the look-ahead logic will have caused one or more slave devices to unnecessarily exit the power saving state.

In one embodiment, at least one master device is a processor core, the processor core being operable to execute monitor code to switch from one domain to another domain, the processor core having a tightly coupled memory (TCM) associated therewith which does not use said power saving state, and the monitor code being stored within the TCM. By retaining the monitor code within the TCM, this ensures that that monitor code is always available for access by the processor core, and hence can be executed quickly, irrespective of whether any other memory devices within the apparatus are in a power saving state or not. In such a system, on starting to execute monitor code, a signal can be issued to cause any slave devices in a power saving state to exit that power saving state, and this exiting of the power saving state can then occur in parallel with the monitor code being executed, such that by the time the monitor code has completed execution to effect the switch from one domain to another domain, the slave devices are then fully powered up and ready to use. Such an approach can be used as an alternative to the earlier-mentioned look-ahead logic.

As mentioned earlier, the plurality of domains can take a variety of forms. However, in one particular embodiment, the plurality of domains comprise a secure domain and a non-secure domain, in said secure domain devices of the data processing apparatus having access to secure data values which are not accessible in said non-secure domain, and at least one of said at least one master devices is operable in a plurality of modes, including at least one non-secure mode being a mode in the non-secure domain and at least one secure mode being a mode in the secure domain. Hence, whilst the secure domain and the non-secure domain provide separate execution spaces separated by hardware enforced boundaries, for any such master devices different modes of operation can also be provided, for example a user mode, a privileged mode, etc. Such modes of operation are typically controlled by the operating system applicable to that master device when executing in a particular domain. In one such embodiment, such a master device may be a CPU.

In one such embodiment, in the non-secure domain at least one master device is operable under the control of a non-secure operating system, and in said secure domain that master device is operable under the control of a secure operating system. Hence, in such embodiments different operating systems are used within the master device, dependent on the domain that that master device is executing in. The secure operating system will typically be significantly smaller than the non-secure operating system and can be viewed as a secure kernel provided to control certain secure functions.

Viewed from a second aspect, the present invention provides a method of operating a data processing apparatus having a plurality of domains in which devices of the data processing apparatus can operate, the data processing apparatus having at least one master device for performing operations, and at least one slave device for use by said at least one master device when performing said operations, the method comprising the steps of: issuing from each said at least one master device a domain ID signal identifying the domain in which that master device is currently operating; determining, based on the domain ID signal issued by each said at least one master device, whether any portion of said at least one slave device is not currently useable; and if it is determined that any such portion is not currently useable, causing that portion to enter a power saving state.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
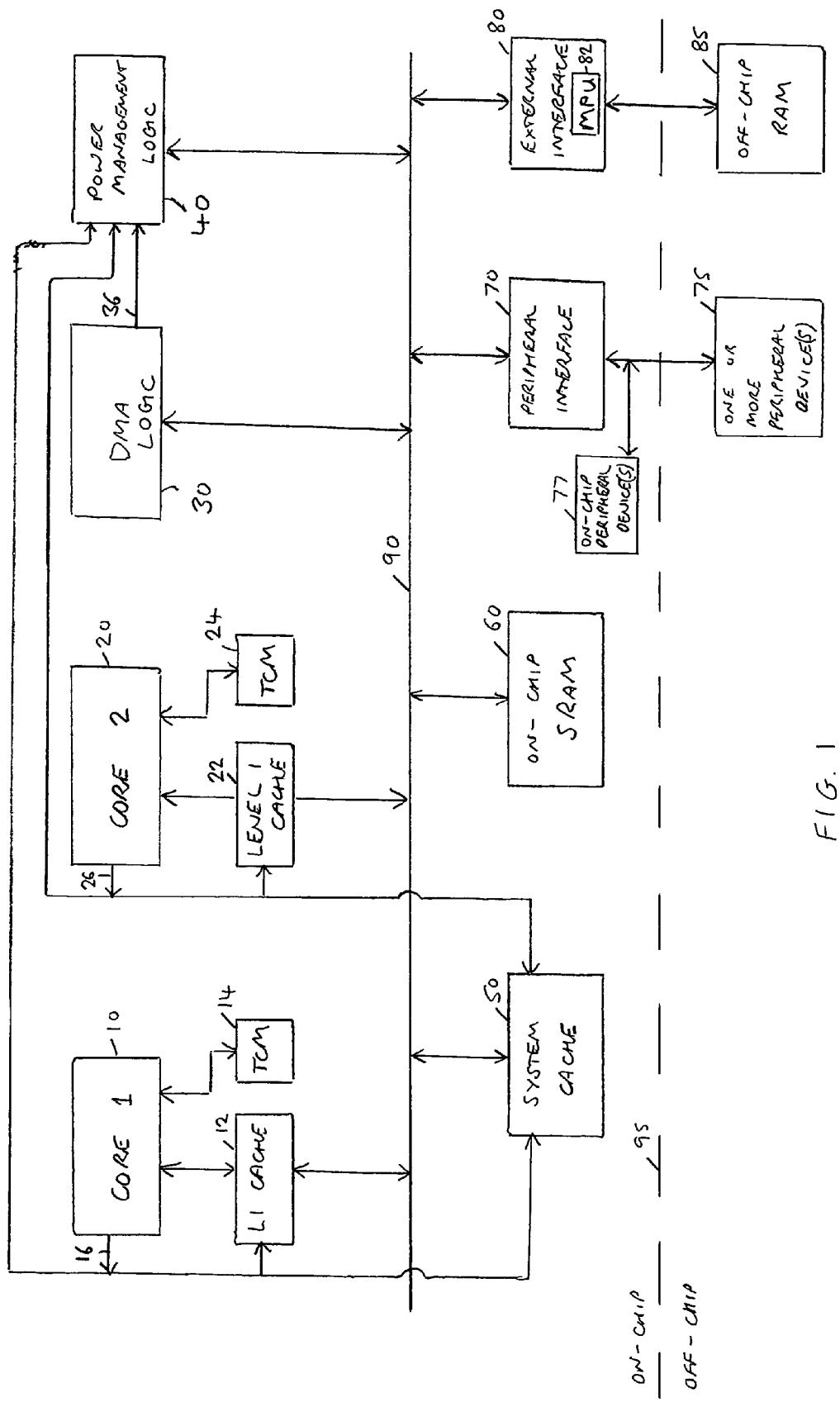
FIG. 1 is a block diagram of a data processing system in which an embodiment of the present invention may be employed.

FIG. 1 is a block diagram of a data processing system in which embodiments of the present invention may be employed. The system includes a number of master devices, including two processor cores 10, 20 and DMA logic 30. Each of the processor cores 10, 20 has its own associated level one cache 12, 22 and TCM 14, 24. The various master devices are connected with a number of slave devices via a system bus 90. In particular, one slave device provided is a system cache 50 which can store data values for access by processor core 10 or processor core 20, those processor cores hence sharing access to the system cache 50. Further, on-chip memory in the form of on-chip Static Random Access Memory (SRAM) 60 is provided which is accessible by any of the master devices 10, 20, 30.

Also provided as slave devices are one or more peripheral devices 75, 77 which are accessed via a peripheral interface 70 interconnecting the system bus 90 with a peripheral bus. As shown in FIG. 1, these peripheral devices 75 may exist off-chip, although in some embodiments some of the peripheral devices may be provided on-chip. Indeed there will often be at least an on-chip component (if only a set of configuration registers and an interface logic) even if much of the functional logic is provided by an external device, and this on-chip part is shown schematically by block 77 in FIG. 1. Further, off-chip memory in the form of off-chip RAM 85 is provided which is accessible via an external interface 80.

In accordance with one embodiment of the present invention, the data processing apparatus has a plurality of domains in which the devices of the data processing apparatus can operate. In one particular embodiment, the plurality of domains comprises a secure domain and a non-secure domain, and predetermined access rights are associated with each domain. In particular, in one embodiment, when operating in the non-secure domain, a device can only access non-secure data associated with that non-secure domain. Hence, any device operating in the non-secure domain cannot access secure data pertaining to the secure domain. The predetermined access rights associated with the secure domain can take a variety of forms, but typically will allow a device operating in the secure domain to access both the secure data of the secure domain and the non-secure data of the non-secure domain.

Each of the master devices 10, 20, 30 can only operate in one domain at a time, but at any point in time those individual master devices may be operating in different domains with respect to each other.

The caches 12, 22, 50 within the data processing apparatus can be arranged to store both secure data and non-secure data and, as will be discussed later with reference to FIG. 2, a bit can be associated with each cache line to identify whether the data stored in that cache line is secure data or non-secure data. More details of a cache arranged in such a way is described in commonly assigned co-pending U.S. patent application Ser. No. 10/714,481, the contents of which are herein incorporated by reference.

The off-chip RAM 85 is also arranged to store secure data and non-secure data, and a system memory protection unit (MPU) 82 is provided for protecting access to content in the off-chip RAM 85. In particular, the system MPU 82 can be arranged to police accesses to the off-chip RAM 85 in order to ensure that no access to secure memory regions within the off-chip RAM occurs when a memory access request is issued by a master device pertaining to the non-secure domain. Such a system MPU is described in the earlier-mentioned U.S. patent application Ser. No. 10/714,561.

As memory decreases in size, it is becoming more practical to provide on-chip memory in addition to off-chip memory, and accordingly on-chip SRAM 60 can be provided. In particular, from a security stand point, on-chip memory can inherently be made more secure, since there are no external pins through which to gain access to the memory. When in off-chip memory, it is possible for secure data to be observed by directly manipulating the pins of the RAM chip itself, or observing transactions on the external bus. Hence, in one embodiment, the on-chip SRAM 60 is provided solely for storing secure data accessible from the secure domain. Again, a system MPU, or modified address logic such as memory wrapper logic performing an equivalent function to an MPU, can be provided in association with the on-chip SRAM 60 to police accesses to the on-chip SRAM 60 to ensure that no access request pertaining to the non-secure domain is allowed to proceed if it is seeking to access the on-chip SRAM 60. Such logic is not shown explicitly in FIG. 1, but can be considered to form part of the on-chip SRAM block 60.

The on-chip SRAM 60, the peripheral devices 75 and the off-chip RAM 85 can all in principle be accessed by any of the master devices 10, 20, 30. However, as mentioned earlier, the on-chip SRAM is used solely to store secure data, and accordingly any master device can only access that SRAM when executing in the secure domain. Similarly, certain of the peripheral devices may only be useable by a master device operating in the secure domain and will not respond to accesses issued from the non-secure domain. In particular, in one embodiment the peripheral interface 70 includes bridge logic that is aware of which peripherals are secure and which are not, and rejects any attempt to access a secure peripheral from the non-secure domain. In such cases, the access request never reaches the peripheral device.

Whilst the processor cores 10, 20 may be used to perform a variety of data processing tasks, the DMA logic 30 is typically used for block data transfer processes. As an example of use of the DMA logic, the DMA logic may be used to transfer blocks of data to and from the off-chip RAM 85, or to transfer data from either the on-chip SRAM 60 or the off-chip RAM 85 to certain peripheral devices 75. Further the DMA logic may be used to transfer blocks of data from off-chip mass storage memory, such as Flash or ROM memory (not shown in FIG. 1), into RAM memory, as mass storage is typically relatively slow to access.

From the above description, it will be appreciated that some of the slave devices, or at least portions of those slave devices, will not be useable when the master devices 10, 20, 30 are operating in particular domains. In particular, if all of the master devices are currently operating in the non-secure domain, then any portions of the slave devices which are exclusively useable only by a device operating in the secure domain cannot be used at that time. To avoid unnecessary power being consumed by such portions of the slave devices, power management logic is provided either directly associated with particular slave devices, or centrally for managing the power state of multiple slave devices. In particular, as will be described later with reference to FIG. 2, each of the caches 12, 22, 50 include their own associated power management logic for turning individual cache lines, or blocks of cache lines, between a fully powered state and a power saving state based on information about the domains in which the relevant master devices are currently operating. Further, as shown in FIG. 1, central power management logic 40 is provided for controlling the power state of the on-chip SRAM 60 and/or one or more of the peripheral devices 75. In principle, this power management logic 40 can also be used to control the power state of particular regions of the off-chip RAM 85, assuming individual regions of that off-chip RAM only store secure data, and can be independently transitioned into a power saving state whilst retaining other parts of the off-chip RAM in a fully powered on state. In such an embodiment, the on-chip power management logic 40 would generally send control signals to an off-chip power block that in turn would control the flow of electrical power to the off-chip RAM dependent on control signals it receives from the power management logic 40.

In one embodiment, the power management logic 40 is used to control the power state of any slave device which is solely useable in a single domain. In particular, in one embodiment, the on-chip SRAM 60 is only accessible by devices operating in the secure domain, and in addition one or more of the peripheral devices 75 may only be useable by devices operating in the secure domain. For such slave devices, the power management logic 40 is arranged to review the current operating domain of each of the master devices 10, 20, 30, and if all of those master devices are operating in the non-secure domain, it causes those slave devices to enter a power saving state.

As shown in FIG. 1, in accordance with embodiments of the present invention, each of the master devices 10, 20, 30 is arranged to output over paths 16, 26, 36 a domain ID signal identifying the domain in which that master device is currently operating. As can be seen from FIG. 1, the domain ID signal issued by processor core 10 is routed to its associated level one cache 12, to the system cache 50 and to the power management logic 40. This is due to the fact that the processor core can access the level one cache 12, the system cache 50, and a number of the slave devices whose power is managed by the power management logic 40. Similarly, the processor core 20 outputs its domain ID signal to its associated level one cache 22, to the system cache 50 and to the power management logic 40. As regards the DMA logic 30, it outputs its domain ID signal to the power management logic 40, since the slave logic devices that it accesses, and which can potentially enter a power saving state, have their power state managed by the power management logic 40.

Figure 2:
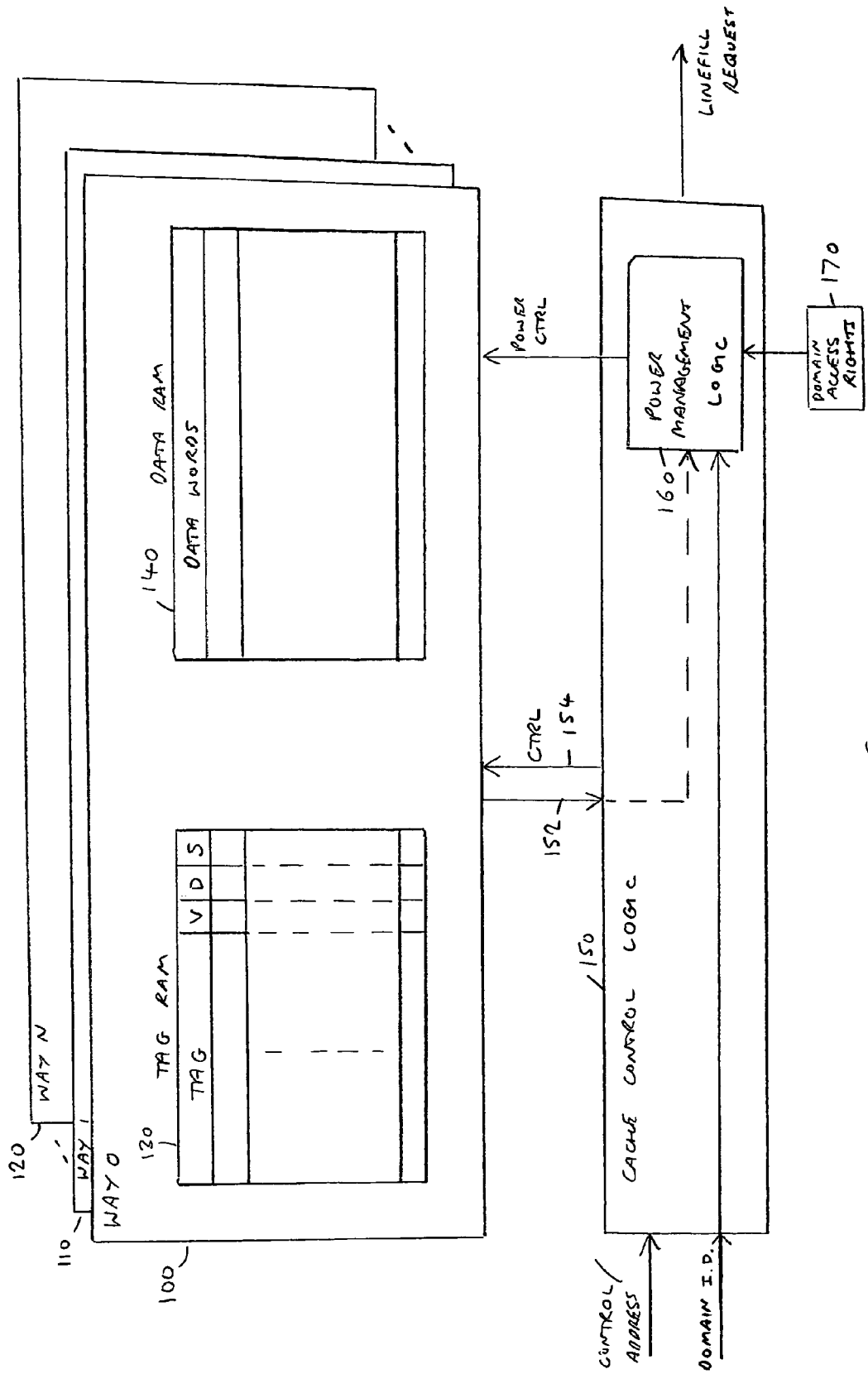
FIG. 2 is a diagram illustrating the operation of power management logic provided within cache control logic in accordance with one embodiment of the present invention.

FIG. 2 is a block diagram illustrating the structure of a cache, which may form the level one cache 12, the level one cache 22 or the system cache 50. Indeed, as will be appreciated by those skilled in the art, each of the level one caches 12, 22 may actually consist of separate instruction and data caches, and each instruction and data cache can be arranged as shown in FIG. 2. As shown in FIG. 2, the cache is an N-way set associative cache, and each way 100, 110, 120 has a tag RAM 130 and a data RAM 140. The data RAM 140 consists of a plurality of cache lines, each cache line typically storing a plurality of data values, for example data words. For each cache line, the tag RAM 130 has a corresponding entry, that entry storing a tag value along with certain other control bits. In particular, a valid bit V is included to identify whether the data values in the corresponding cache line are still valid, and a dirty bit D is provided to identify whether any of the data values in the corresponding cache line have been updated without that update being at the same time stored back to memory. Further, a security bit S is provided to identify whether the data values in the corresponding cache line are secure data pertaining to the secure domain or non-secure data pertaining to the non-secure domain. In one embodiment, the S bit has a value of zero if the data values in the corresponding cache line are secure data values, and has a value of one if the data values in the corresponding cache line are non-secure data values.

When a memory access request is issued by a master device, that memory access request will identify an address associated with the data value the subject of the memory access request, along with certain other control information, for example whether the data value is cacheable, bufferable, etc. This address and control information is provided to the cache control logic 150 as shown in FIG. 2, to cause a cache lookup procedure to be initiated within the ways 100, 110,

120 of the cache. Each address associated with the memory access request can be considered to comprise a tag portion, an index portion and an offset portion. The index portion identifies a particular set within the set associative cache, a set comprising of a cache line in each of the ways. Accordingly, for a four way set associative cache, each set has four cache lines.

The lookup procedure performed by the cache on receipt of a memory access request will typically involve the index part of the address being used to identify an entry in each tag RAM 130 associated with the relevant set, with the tag value in that entry being output to comparator logic (not shown) which compares that tag value with the tag portion of the address. If the comparator detects a match between the tag portion of the address and one of the tag values accessed using the index portion, and assuming the valid bit indicates that the corresponding cache line is valid, then a hit signal is generated to identify a hit within the cache. The associated data RAM is then accessed in order to access the required data value, using the index part of the address to access the relevant set and the offset part of the address to access the relevant data value within the cache line.

Control information is passed from the cache control logic 150 to the ways 100, 110, 120 to cause the above lookup procedure to be performed, and the results of that lookup procedure are routed back to the cache control logic 150. In the event of a cache miss, indicating that the data value the subject of the memory access request is not currently stored within the cache, then the cache control logic 150 can issue a linefill request to cause a cache line's worth of data to be retrieved from memory for storing in one of the cache lines of the cache. In particular, one of the current cache lines in the relevant set will be identified for eviction, and if the data in that cache line is valid and dirty, then that cache line's data will be written back to memory prior to the new data the subject of the linefill request being overwritten in that cache line. When as a result of that linefill request a new line's worth of data values are stored in the cache, then the valid bit in the associated tag entry will be set to indicate that the data is valid, the dirty bit will be set to indicate that the data is not dirty, and the S bit will be set as appropriate to identify whether the data stored in the cache line is secure data or non-secure data.

In accordance with embodiments of the present invention, the cache control logic 150 also includes power management logic 160 which is arranged to issue power control signals to the ways 100, 110, 120 of the cache to cause any cache lines containing secure data to enter a power saving state in certain situations. In particular, the power management logic 160 receives domain ID signals issued by any master devices having access to the associated cache. Accordingly, the power management logic 160 within the level one cache 12 will receive the domain ID signal issued by the processor core 10 over path 16. Similarly, the power management logic 160 within the level one cache 22 will receive the domain ID signal issued by processor core 20 over path 26. Likewise, the power management logic 160 within the system cache 50 will receive the domain ID signals from both the processor core 10 and the processor core 20.

Further, the power management logic 160 has access to domain access rights 170 which, for each domain, identify any other of the domains whose data values can be accessed from that domain. Accordingly, the domain access rights for the non-secure domain will identify that the non-secure domain cannot access data from the secure domain, whilst the domain access rights for the secure domain will identify that non-secure data pertaining to the non-secure domain can also be accessed from the secure domain. These domain access rights will typically be predetermined and are not altered during use of the data processing apparatus. These domain access rights can be stored in a variety of locations, and may for example be stored within a control register of the data processing apparatus accessible to the power management logic 160.

Additionally, the power management logic 160 receives via path 152 an indication as to which cache lines store secure data, this information being derived from the S bit fields in each of the tag RAM entries of the various ways. Accordingly, the power management logic 160 can detect a situation where all of the relevant master devices are currently executing in the non-secure domain, and then based on the domain access rights 170 will conclude that any cache lines containing secure data pertaining to the secure domain are not accessible at the current time. Based on the information received over path 152 it can then issue a power control signal to the ways 100, 110, 120 in order to cause any cache lines containing secure data to enter a power saving state.

In the above described embodiment, it is assumed that the cache can selectively power down individual cache lines. Techniques for achieving this have been described in a number of articles, see for example the article "Drowsy Instruction Caches: Leakage power reduction using dynamic voltage scaling and cache sub-bank prediction" by N Kim et al, Proceedings of the 35$^{th}$ Annual International Symposium on Microarchitecture, November 2002, or the article "Drowsy Caches: Simple Techniques for Reducing Leakage Power" by K Flautner et al, Proceedings of the 29$^{th}$ Annual International Symposium on Computer Architecture, pages 147 to 157, May 2002.

Even in caches that do not support individual cache lines entering power saving states, portions of the cache may still be able to be powered down separately to other portions. For example, individual ways may be able to be powered down. In such caches, it may be possible to arrange that secure data is always stored in a particular way or ways of the cache, such that the power management logic is operable to issue a power control signal to cause that way/those ways to enter a power saving state when it detects that the relevant master devices are all operating in the non-secure domain.

Figure 3:
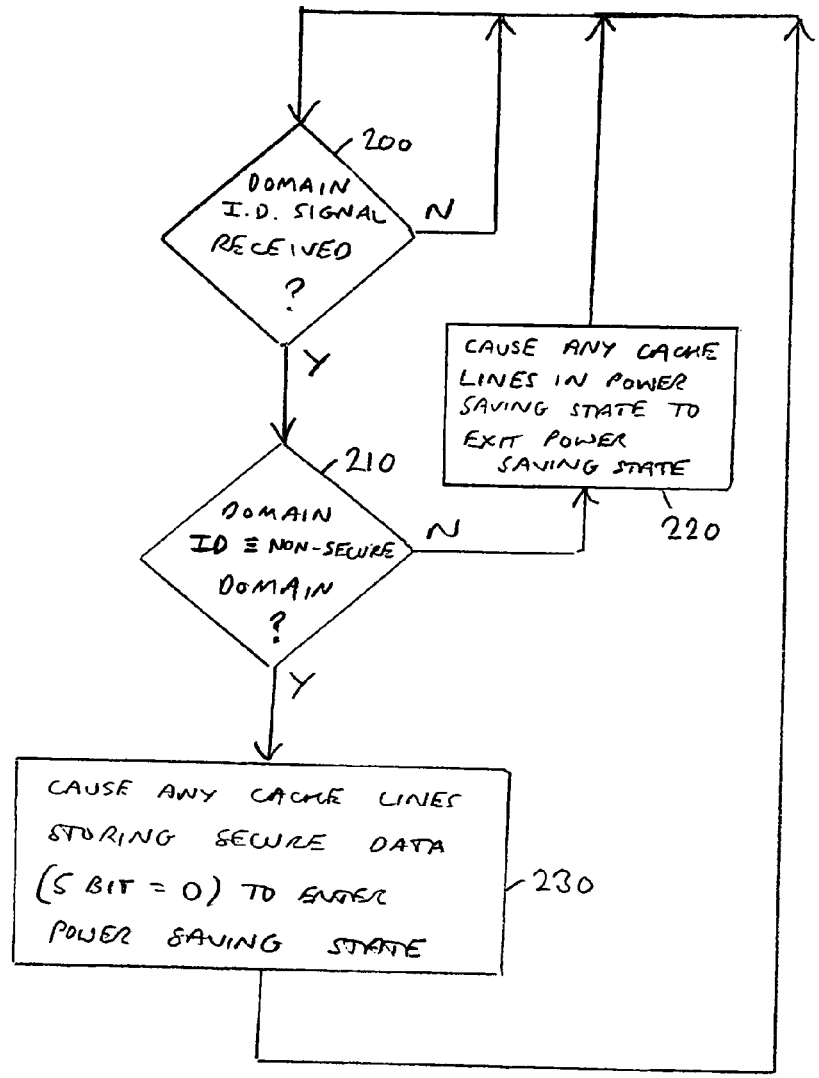
FIGS. 3 to 5 are flow diagrams illustrating operation of power management logic in accordance with three embodiments of the present invention.

FIG. 3 is a flow diagram illustrating the operation of the power management logic 160 when provided within the cache control logic of the level one cache 12 or the level one cache 22. At step 200, it is determined whether a domain ID signal has been received, in one embodiment the domain ID signal taking the form of a pulse signal which is issued when the master device changes from one domain to another domain. In an alternative embodiment, the domain signal may be continuously transmitted. If a domain ID signal is received at step 200, it is then determined at step 210 whether that domain ID signal indicates that the associated processor core is operating in the non-secure domain. It should be noted that the level one caches 12 and 22 are associated with particular processor cores 10 and 20 respectively, and accordingly each cache will only receive a single domain ID signal. Accordingly, if it is determined at step 210 that the received domain ID signal pertains to the non-secure domain, then the process proceeds to step 230, where any cache lines storing secure data (i.e. with their S bit set to zero) are caused to enter the power saving state, as discussed earlier with reference to FIG. 2.

If at step 210, it is determined that the domain ID signal does not indicate that the associated processor core is operating in the non-secure domain, then the process proceeds to step 220, where any cache lines that are in the power saving state are caused to exit the power saving state, this being achieved by the power management logic issuing an appropriate power control signal to the relevant ways 100, 110, 120 of the cache.

Following either step 220 or step 230, the process returns to step 200 to await receipt of the next domain ID signal.

Figure 4:
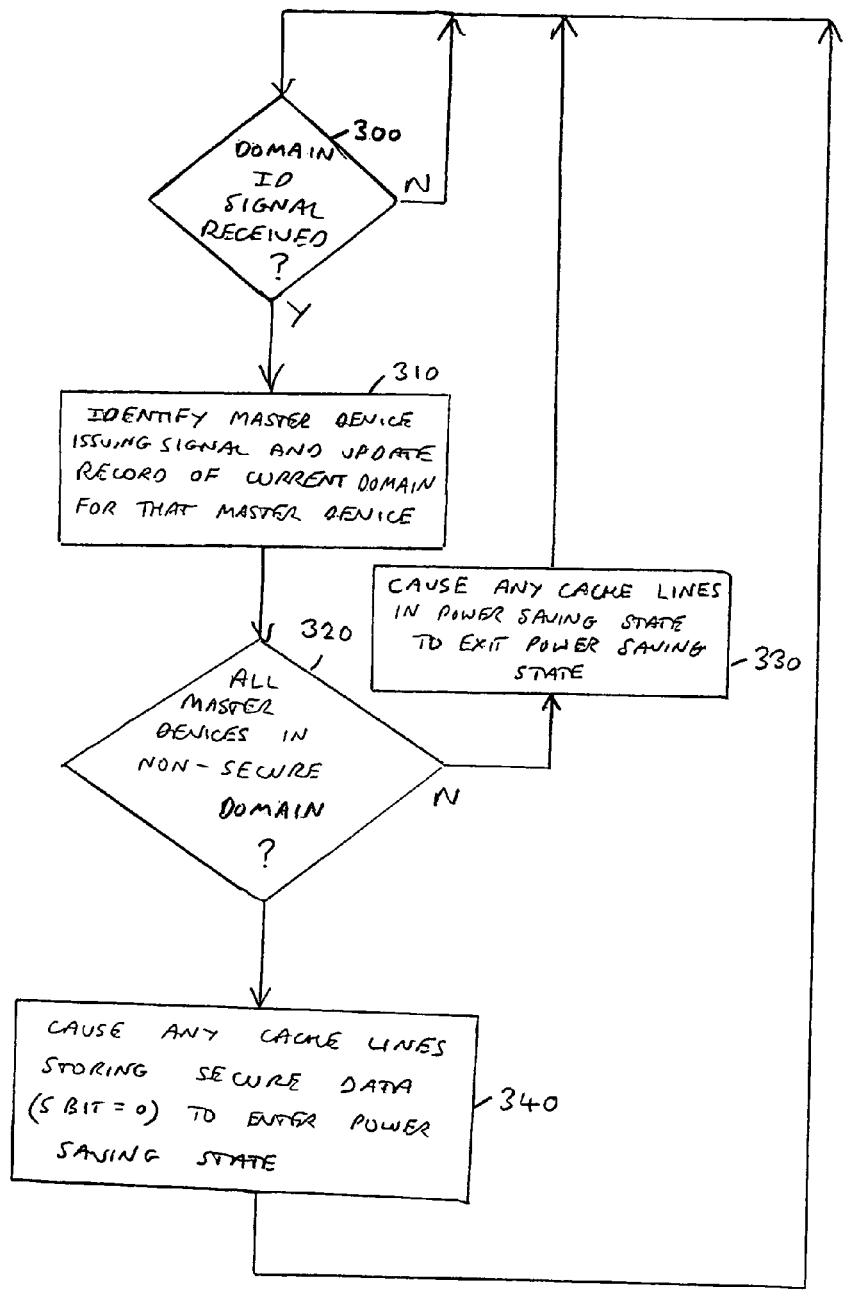

FIG. 4 is a flow diagram illustrating the operation of the power management logic 160 when provided in association with the system cache 50 of FIG. 1. At step 300, it is determined whether a domain ID signal has been received. As discussed earlier with reference to FIG. 3, typically the domain ID signal will be issued as a pulse signal when a master device changes from operating in one domain to operating in another domain. Since the system cache 50 can be used by multiple master devices, in particular the processor core 10 or the processor core 20 illustrated in FIG. 1, then following receipt of a domain ID signal at step 300, it is necessary at step 310 to identify the master device issuing that signal, and to update a record of the current domain for that master device. In particular, the power management logic 160 may internally retain a bit for each master device indicating the current domain that that master device is operating in, with that bit being updated each time a domain ID signal is received from that master device. Each domain ID signal can be arranged to include a reference to the master device issuing that domain ID signal, or alternatively the power management logic 160 may have a dedicated input for each domain ID signal.

Thereafter, at step 320, the power management logic 160 determines whether all of the master devices that can access the system cache are operating in the non-secure domain. If not, then any cache lines that are in the power saving state are caused to exit the power saving state at step 330, prior to the process returning to step 300. However, assuming all master devices are operating in the non-secure domain, then the process proceeds to step 340, where any cache lines storing secure data are caused to enter the power saving state, whereafter the process returns to step 300.

Figure 5:
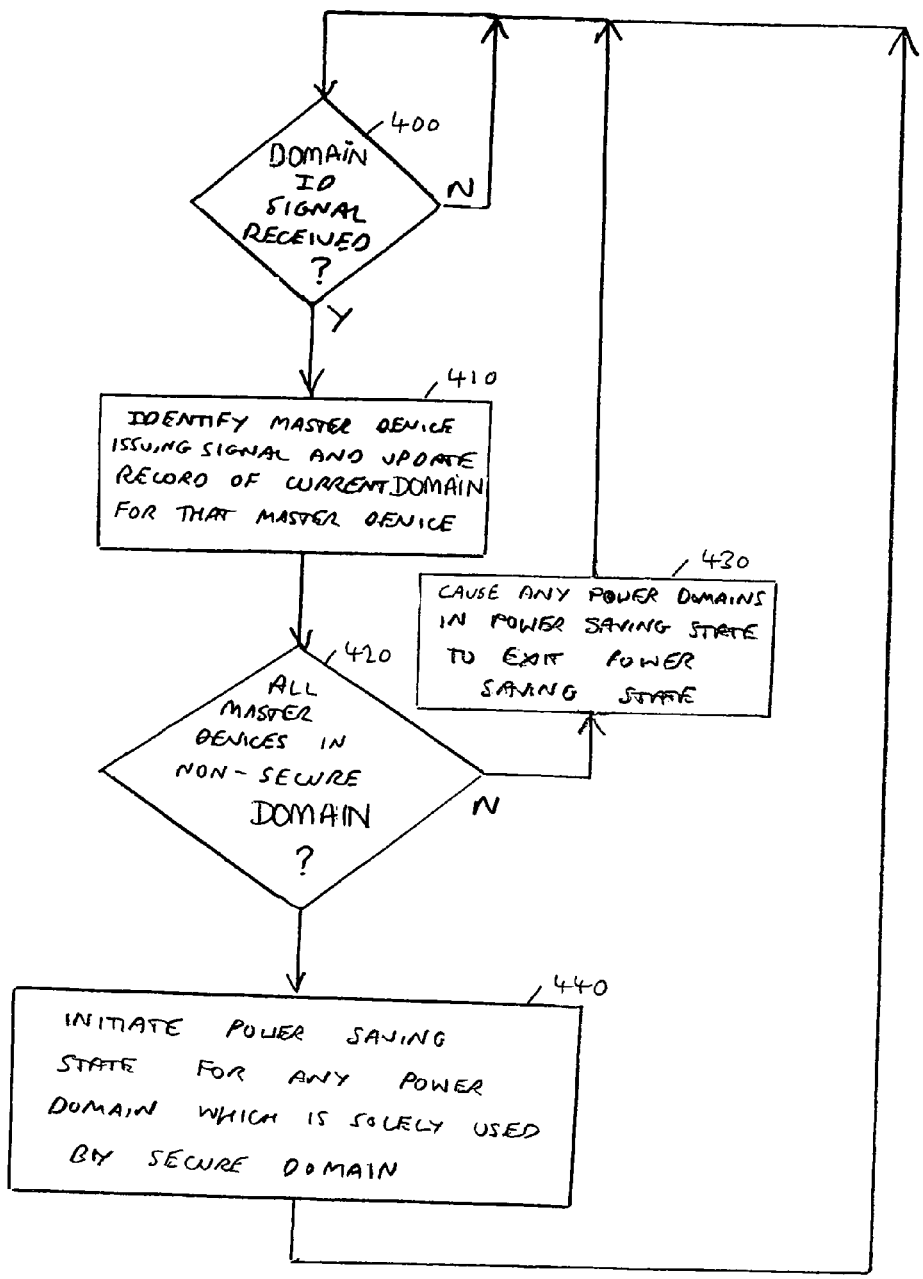

FIG. 5 is a flow diagram illustrating the operation of the power management logic 40 of FIG. 1. At step 400, it is determined whether a domain ID signal has been received, again the domain ID signals typically being issued as pulses when master devices change from operating in one domain to operating in another domain. Upon receipt of a domain ID signal, then the power management logic 40 identifies the master device issuing the signal and updates its record of the current domain for that master device. As discussed earlier with reference to FIG. 4, each domain ID signal can be arranged to include a reference to the master device issuing that domain ID signal, or alternatively the power management logic 40 may have a dedicated input for each domain ID signal. Further, the power management logic 40 can retain some internal state identifying the current domain for each relevant master device, in an analogous way to that described earlier with reference to FIG. 4 for the power management logic 160.

Thereafter, at step 420, the power management logic 40 determines whether all of the master devices are in the non-secure domain. The components provided on-chip may be grouped together for the purposes of distributing power, so as to provide a number of distinct power domains within the chip. These power domains are not to be confused with the operating domains of the devices described earlier. Within each power domain, power management techniques can be used to control the power supply provided to those power domains. Accordingly, any slave devices, or portions of slave devices, that can only be used by the secure domain can be grouped together within a particular power domain or power domains. If at step 420 it is determined that all of the master devices (in this instance the processor core 10, the processor core 20 and the DMA logic 30) are executing in the non-secure domain, then at step 440 the power management logic 40 can initiate a power saving state in respect of any power domain which is solely used by the secure domain. Accordingly, by way of example, the on-chip SRAM 60 may be placed in such a power domain, since as described earlier in one embodiment it is used solely to store secure data accessible from the secure domain. Following step 440, the process returns to step 400.

If at step 420 it is determined that not all of the master devices are operating in the non-secure domain, then at step 430 any power domains that are in the power saving state are caused to exit that power saving state, whereafter the process returns to step 400.

One issue that arises from placing one or more of the slave devices in a power saving state is that when subsequently one of the master devices changes its domain, such that that slave device then needs to be accessed, that slave device has first to exit the power saving state before it can be used. Since this will take a certain period of time, this can potentially have an adverse impact on performance. In one embodiment, this problem is alleviated through the provision of look-ahead logic within prefetch logic of the processor core 10 or the processor core 20.

Figure 6:
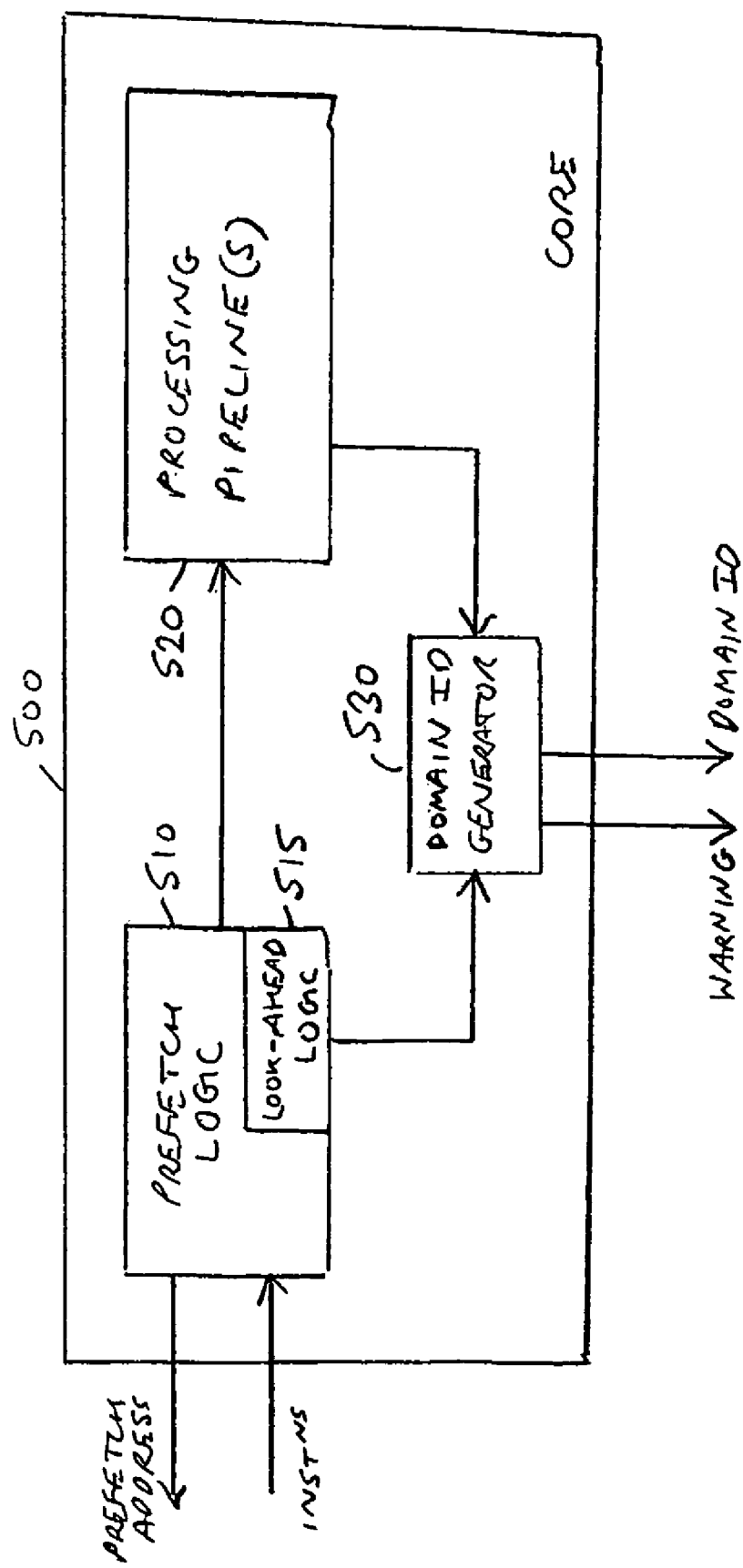
FIG. 6 is a diagram illustrating the generation of a domain ID signal within a processor core in accordance with one embodiment of the present invention.

FIG. 6 is a diagram illustrating the processor core 500 including such look-ahead logic, this processor core 500 being useable as either or both of the processor cores 10, 20 of FIG. 1. As will be appreciated by those skilled in the art, a processor core 500 will typically include prefetch logic 510 for prefetching instructions for execution by the processing pipeline or processing pipelines 520 of the processor core prior to those instructions actually being needed by those pipelines. The aim of the prefetch logic is to prefetch instructions so that there is a continuous stream of instructions available for issuing to the processing pipelines 520 as and when needed. As will be appreciated by those skilled in the art, such prefetch logic 510 typically includes prediction logic for predicting instructions that will be needed by the processing pipeline and issuing prefetch addresses in respect of those instructions, in order to cause those instructions to be retrieved from the level one cache (or more particularly the instruction cache if separate instruction and data caches are provided).

In accordance with embodiments of the present invention, a domain ID generator 530 is provided within the processor core, which is arranged to issue the domain ID signal when the core changes from operating in one domain to operating in another domain. In particular, the processor core can be arranged to execute a piece of code called monitor code to manage the transition from one domain to another domain, and when executing such monitor code, will cause a signal to be issued from the processing pipeline 520 to the domain ID generator 530, to cause the domain ID signal to be altered. However, since as discussed earlier the power management logic reacts to the change in the domain ID signal, such an approach could mean that the change of domain takes place before any slave device in a power saving mode is caused to exit that power saving mode, and accordingly this can lead to a potential adverse impact on performance.

In accordance with embodiments of the present invention, the prefetch logic 510 includes look-ahead logic 515 which is used to monitor the instructions being prefetched by the prefetch logic, in order to detect instructions or sequences of instructions that when executed by the processing pipeline 520 will cause a change from one domain to another domain. Using the earlier described example where monitor code is executed to perform such a domain switch, the look-ahead logic 515 can detect the presence of instructions forming that monitor code, and on detecting that monitor code can issue a signal to the domain ID generator 530, to cause a warning signal to be output identifying that a change of domain is possibly about to happen.

Accordingly, if the processor core 500 is currently executing in the secure domain, and the look-ahead logic 515 detects that the processor core will subsequently be executing monitor code, it can cause the warning signal to be issued in association with the domain ID signal identifying the secure domain. Since whilst executing in the secure domain the processor core can have access to both secure data and non-secure data, none of the slave devices will in this embodiment be in the power saving state, and accordingly the warning signal is ignored. If in contrast the processor core 500 is currently executing in the non-secure domain, and the look-ahead logic 515 detects the presence of the monitor code, it will again cause a signal to be issued to the domain ID generator 530 to cause the warning signal to be issued in association with the domain ID signal (which currently identifies the non-secure domain). The relevant power management logic will then determine that if the change indicated by the warning signal does in fact take place, not all of the master devices will be in the non-secure domain, and accordingly as a precaution will cause the power saving state of any relevant slave devices to be exited. Since this action is taken early, it is more likely that by the time the processing pipeline 520 actually executes the monitor code and then changes operation to the secure domain, the relevant slave devices will have exited the power saving state, and accordingly will be ready to be used.

Since the prefetch logic 510 makes predictions as to what code is needed by the processing pipeline, based on for example predicting the outcome of branch instructions, the mere presence of the monitor code within the prefetch logic will not necessarily in all instances guarantee that that monitor code will be executed by the processing pipeline 520, and accordingly signals issued by the look-ahead logic 515 may later prove to be inaccurate. However, given that the warning signal is only used to cause an early exit of the power saving state for any relevant slave device in some instances (in particular a predicted non-secure to secure domain transition), all that will have happened in the event of a misprediction is that the look-ahead logic 515 may have caused some slave devices to unnecessarily exit the power saving state. However, when it is later determined that the domain ID signal has not changed, for example using a timeout mechanism, those slave devices will then re-enter the power saving state, assuming no other relevant master devices have changed their operating domain in the meantime. As an alternative to using a timeout mechanism, more complex look-ahead logic could be used that would assert the warning signal, but then de-assert the signal once it determines that the domain switch is not going to take place, for example due to a branch not being taken, an interrupt or exception occurring causing a change in the running program, etc.

In a more general case where multiple domains are provided, and not just the secure and non-secure domains described earlier, the signal output by the look-ahead logic 515 could be arranged to be issued directly as the warning signal to the relevant power management logic to, if appropriate, cause the power management logic to issue a power control signal to cause any slave devices, or portions thereof, that are in a power saving state to exit the power saving state.

Once the processing pipeline then executes the relevant code to change from one domain to another, as a result of which the domain ID generator then generates a new domain ID signal, the power management logic can implement its standard procedure upon receipt of a changed domain ID signal to determine with reference to the domain access rights 170 whether any portions of the slave devices are not currently useable, and hence can be caused to enter a power saving state.

The look-ahead logic of FIG. 6 has been described in association with a processor core such as cores 10, 20 of FIG. 1. Considering the other master device shown in FIG. 1, namely DMA logic 30, then assuming this is a simple DMA which just processes one batch job, on behalf of one master device, at a time, only a secure master device should be able to program that DMA logic to perform secure transactions. Hence, separate look-ahead logic should not be required in association with the DMA logic because at least one master device must already be in the secure domain before the DMA logic is set running, and hence the secure cache and memory should already be powered up.

However, for a more complex DMA logic, which is capable of running multiple transfers simultaneously, which may consist of a mixture of secure and non-secure transfer tasks, the DMA logic will have some internal architecture which will determine what thread to run next. If this thread would cause a domain access change, then an equivalent to the look-ahead scheme could be provided in the "next thread to run" logic to ensure the memory is powered up in time.

As discussed earlier with reference to FIG. 1, each of the processor cores 10, 20 can have TCM 14, 24 associated therewith. The TCM forms part of the overall memory system of the data processing apparatus, and has its own range of addresses within the total memory system address space. The TCM can be used to store data values used specifically by the associated processor core. In one embodiment, the TCM can be used to store the monitor code used to transition from one domain to another domain, and as can be seen from FIG. 1, the TCM is not subjected to any power management process. Accordingly, the TCM is permanently fully powered on, and hence the monitor code can be readily accessible by the processor core without delay. If the monitor code is accessed directly from the TCM, then in such an embodiment a signal can be issued from the processor core when starting to execute the monitor code, this signal being routed to the power management logic 40 and the power management logic 160 associated with the relevant caches to cause the slave devices, or any portions thereof, to exit the power saving state in parallel with the monitor code being executed by the processor core, such that by the time the monitor code has completed execution to effect the switch from one domain to another domain, the slave devices are then fully powered up and ready for use. This signal issued when starting to execute the monitor code could be the domain ID signal itself (since the monitor code knows what domain is being transitioned to), or alternatively could an equivalent to the earlier mentioned warning signal identifying that a domain change is about to take place. In the latter case, the actual domain ID signal would then be changed when the switch of domains actually takes place. The above-described TCM approach can be used as an alternative to the earlier-mentioned look-ahead logic.

As discussed earlier, in one embodiment each of the processor cores is operable to execute monitor code in order to transition from one domain to another. The operation of such a processor core is described in detail in the earlier-mentioned co-pending U.S. patent application Ser. No. 10/714,561. FIGS. 7 to 10 are provided to indicate an overview of the operation of such processor cores, and the reader is referred to the above-mentioned US patent application for further details.

Figure 7:
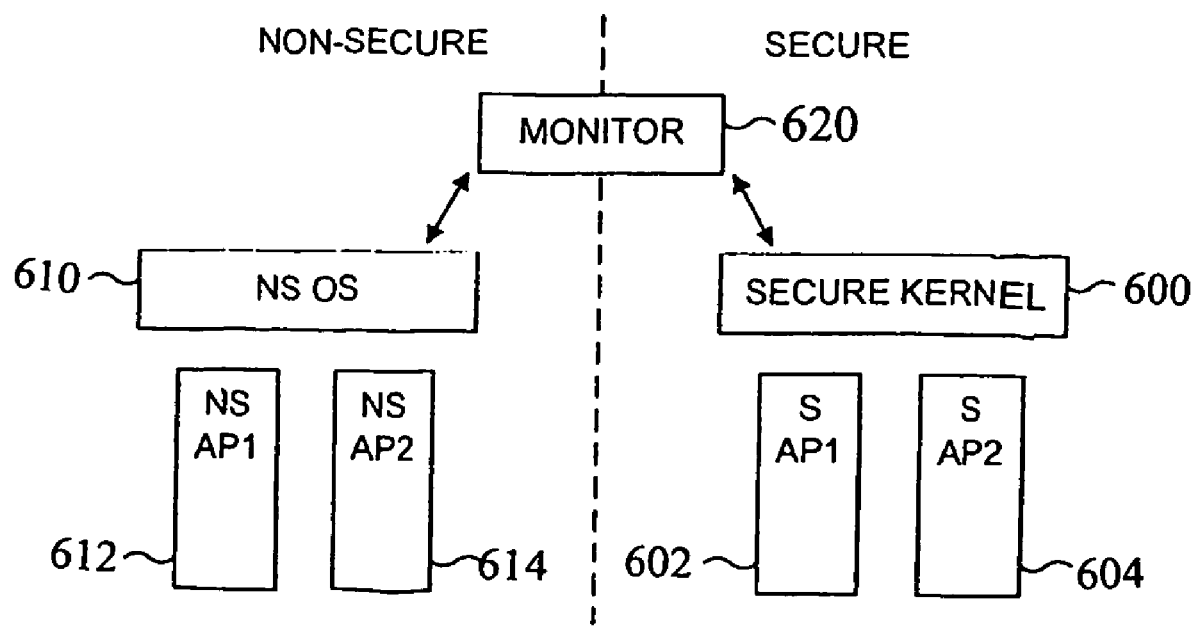
FIG. 7 schematically illustrates different programs operating in a non-secure domain and a secure domain.

FIG. 7 schematically illustrates various programs running on a processing system having a secure domain and a non-secure domain. The system is provided with a monitor program 620 which executes at least partially in a monitor mode. The monitor program 620 is responsible for managing all changes between the secure domain and the non-secure domain in either direction. From a view external to the core the monitor mode is always secure and the monitor program is in secure memory.

Within the non-secure domain there is provided a non-secure operating system 610 and a plurality of non-secure application programs 612, 614 which execute in cooperation with the non-secure operating system 610. In the secure domain, a secure kernel program 600 is provided, and the secure kernel program 600 can be considered to form a secure operating system. Typically such a secure kernel program 600 will be designed to provide only those functions which are essential to processing activities which must be provided in the secure domain such that the secure kernel 600 can be as small and simple as possible since this will tend to make it more secure. A plurality of secure applications 602, 604 are illustrated as executing in combination with the secure kernel 600.

Figure 8:
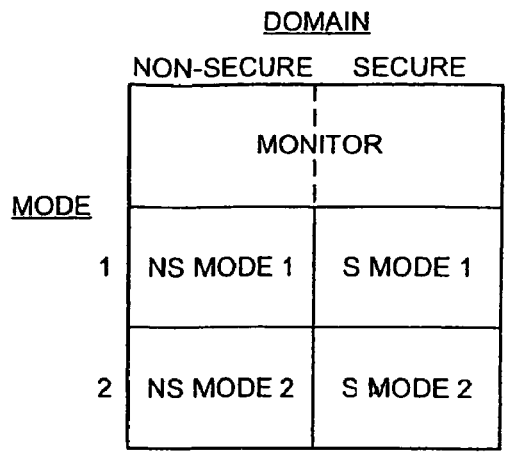
FIG. 8 schematically illustrates a matrix of processing modes associated with different security domains.

FIG. 8 illustrates a matrix of processing modes associated with different security domains. In this particular example, the processing modes are symmetrical with respect to the security domain and accordingly mode one and mode two exist in both secure and non-secure forms.

The monitor mode has the highest level of security access in the system and in this example embodiment is the only mode entitled to switch the system between the non-secure domain and the secure domain in either direction. Thus, all domain switches take place via a switch to the monitor mode and the execution of the monitor program 620 within the monitor mode.

Figure 9:
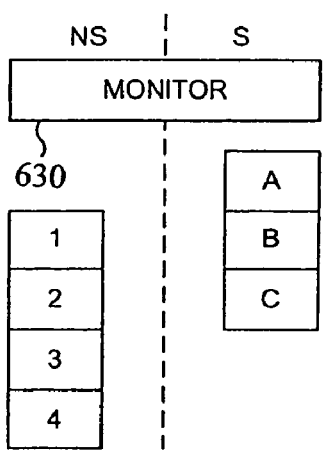
FIGS. 9 and 10 schematically illustrates different relationships between processing modes and security domains.

FIG. 9 schematically illustrates another set of non-secure domain processing modes 1, 2, 3, 4 and secure domain processing modes A, B, C. In contrast to the symmetric arrangement of FIG. 8, FIG. 9 shows that some of the processing modes may not be present in one or other of the security domains. The monitor mode 630 is again illustrated as straddling the non-secure domain and the secure domain. The monitor mode 630 can be considered a secure processing mode, since a secure status flag may be changed in this mode and the monitor program 620 in the monitor mode has the ability to itself set the security status flag. Hence, it effectively provides the ultimate level of security within the system as a whole.

Figure 10:
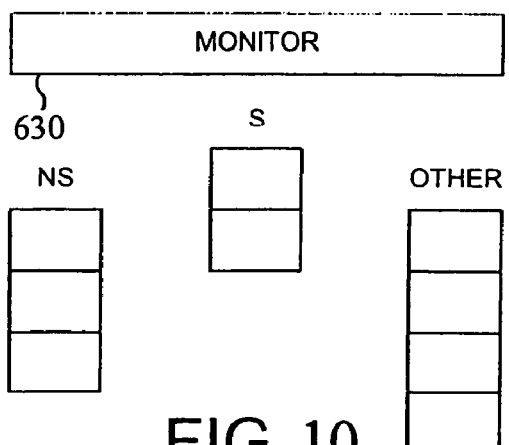

FIG. 10 schematically illustrates another arrangement of processing modes with respect to security domains. In this arrangement both secure and non-secure domains are identified as well as a further domain. This further domain may be such that it is isolated from other parts of the system in a way that it does not need to interact with either of the secure domain or non-secure domain illustrated.

As will be apparent from the above description of embodiments of the present invention, such embodiments enable a reduction in power consumption by caches and other memory devices when they are used in an architecture having multiple execution domains. Such embodiments hence provide a more power efficient memory architecture within a data processing apparatus having a plurality of domains in which devices of the data processing apparatus can operate. Such domains enable separate execution spaces to be defined which are separated by physical level enforcement.

In embodiments of the present invention, the memory and peripheral device split between the various domains (in one particular example the earlier-mentioned secure and non-secure domains) is fixed, and hence there is no real need for the expensive "reverse mapping" operation such as described in the earlier mentioned IBM article "Supporting Isolation for Fault and Power Management with Fully Virtualized Memory Systems" by F Rawson. Instead, it is known explicitly which memory and peripheral devices belong to which domain. Because of this, the decision to enter a power saving state can be entirely contained within hardware logic in such embodiments, without the need for any separate software component.

Whilst embodiments of the present invention have been described with reference to a system having a secure domain and a non-secure domain, it will be appreciated that the techniques described herein are also applicable to systems having more than two separate domains, each domain of which has its own predetermined domain access rights.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A data processing apparatus having a plurality of domains in which devices of the data processing apparatus can operate, wherein said plurality of domains comprising a secure domain and a non-secure domain, and, in said secure domain, devices of the data processing apparatus have access to secure data values which are not accessible in said non-secure domain, said data processing apparatus comprising:
   at least one master device for performing operations, each said at least one master device being arranged to issue a domain ID signal identifying the domain in which that master device is currently operating;
   at least one slave device for use by said at least one master device when performing said operations; and
   power control logic for determining, based on the domain ID signal issued by each said at least one master device, whether any portion of said at least one slave device is not currently useable and if so to cause any such portion to enter a power saving state.

2. A data processing apparatus as claimed in claim 1, wherein:
   each portion of said at least one slave device has a control field associated therewith indicating which of said plurality of domains are allowed to use that portion; and
   the power control logic is operable for each portion, to reference said associated control field and the domain ID signal issued by each said at least one master device, in order to determine whether that portion is not currently useable, and if so to cause that portion to enter said power saving state.

3. A data processing apparatus as claimed in claim 1, wherein said at least one slave device comprises at least one memory device for storing data values for access by the at least one master device when performing said operations.

4. A data processing apparatus as claimed in claim 3, wherein:

each portion of said at least one memory device has a control field associated therewith identifying with which domain the data values stored in that portion are associated;

each domain has predetermined access rights associated therewith identifying any other of said plurality of domains whose data values can be accessed from that domain; and the power control logic is operable for each portion, to reference said associated control field, said predetermined access rights, and the domain ID signal issued by each said at least one master device, in order to determine whether that portion is not currently accessible, and if so to cause that portion to enter said power saving state.

5. A data processing apparatus as claimed in claim 3, wherein:

said at least one memory device comprises a cache; and said power control logic is operable to determine, based on the domain ID signal issued by each said at least one master device having access to said cache, whether any portion of said cache is not currently accessible and if so to cause any such portion to enter said power saving state.

6. A data processing apparatus as claimed in claim 5, wherein:

each portion comprises one or more cache lines, for each portion the cache having a control field identifying with which domain the data values stored in that portion are associated; and said power control logic is operable to determine for each portion, having regard to the associated control field, whether that portion is currently accessible by any of said at least one master device having access to said cache, and if not to cause that portion to enter said power saving state.

7. A data processing apparatus as claimed in claim 6, wherein:

each domain has predetermined access rights associated therewith identifying any other of said plurality of domains whose data values can be accessed from that domain; and the power control logic is operable for each portion, to reference said associated control field, said predetermined access rights, and the domain ID signal issued by each said at least one master device having access to said cache, when determining whether that portion is currently accessible.

8. A data processing apparatus as claimed in claim 6, wherein each portion comprises a single cache line.

9. A data processing apparatus as claimed in claim 5, wherein one of said at least one master devices is a processor core and said cache is associated with, and only accessible by, that processor core.

10. A data processing apparatus as claimed in claim 5, wherein said at least one master device comprises a plurality of master devices, and said cache is accessible by multiple of said master devices.

11. A data processing apparatus as claimed in claim 5, wherein said power control logic is provided within cache control logic associated with the cache.

12. A data processing apparatus as claimed in claim 3, wherein at least one of said at least one memory devices is a domain specific memory device having a single portion used solely to store data values associated with a particular one of said plurality of domains, such that if said power control logic determines that that single portion is not currently useable, the entire domain specific memory device is caused to enter said power saving state.

13. A data processing apparatus as claimed in claim 1, further comprising:

look-ahead logic associated with at least one of said at least one master devices, and operable to detect a situation which will subsequently cause the associated master device to change from a current domain to a new domain, and upon detecting said situation to cause any portion of said at least one slave device in said power saving state to exit said power saving state.

14. A data processing apparatus as claimed in claim 13, wherein the associated master device is a processor core operable to execute a sequence of instructions, and the look-ahead logic is operable to detect said situation by detecting one or more instructions that when subsequently executed by the processor core will case the domain to change.

15. A data processing apparatus as claimed in claim 1, wherein at least one of said at least one master devices is a processor core, the processor core being operable to execute monitor code to switch from one domain to another domain, the processor core having a tightly coupled memory associated therewith which does not use said power saving state, and the monitor code being stored within the tightly coupled memory.

16. A data processing apparatus as claimed in claim 1, wherein:

said plurality of domains comprise a secure domain and a non-secure domain, in said secure domain devices of the data processing apparatus having access to secure data values which are not accessible in said non-secure domain; and at least one of said at least one master devices is operable in a plurality of modes, including at least one non-secure mode being a mode in the non-secure domain and at least one secure mode being a mode in the secure domain.

17. A data processing apparatus as claimed in claim 16, wherein in said non-secure domain said at least one of said at least one master devices is operable under the control of a non-secure operating system, and in said secure domain said at least one of said at least one master devices is operable under the control of a secure operating system.

18. A method of operating a data processing apparatus having a plurality of domains in which devices of the data processing apparatus can operate, wherein said plurality of domains comprising a secure domain and a non-secure domain, and, in said secure domain, devices of the data processing apparatus have access to secure data values which are not accessible in said non-secure domain, the data processing apparatus having at least one master device for performing operations, and at least one slave device for use by said at least one master device when performing said operations, the method comprising the steps of:

issuing from each said at least one master device a domain ID signal identifying the domain in which that master device is currently operating;

determining, based on the domain ID signal issued by each said at least one master device, whether any portion of said at least one slave device is not currently useable; and if it is determined that any such portion is not currently useable, causing that portion to enter a power saving state.

* * * * *